Aug. 22, 1933.  A. F. VICTOR  1,923,855

FILM CONTROL DEVICE

Filed May 17, 1929

Inventor:
Alexander Ferdinand Victor.

Thomason & Linedy
Attys

Patented Aug. 22, 1933

1,923,855

UNITED STATES PATENT OFFICE 1,923,855

FILM CONTROL DEVICE

Alexander Ferdinand Victor, New York, N. Y.

Application May 17, 1929. Serial No. 363,768

3 Claims. (Cl. 88—18)

My present invention relates to devices for controlling the movement of motion-picture film, and it is especially designed for use in connection with cameras and other cinematograph apparatus in which provision is made for the photographing of ultra-rapid or slow-motion pictures. The structure, however, may be used to advantage in any type of motion-picture apparatus regardless of the speed at which the film is capable of being moved.

In photographing ultra-rapid or slow-motion pictures the film engaging and actuating mechanism is speeded up many times faster than the ordinary or normal speed of the camera, with the result that the element which successively engages in the film apertures, usually in a reciprocatory path, must travel at an extremely high speed. When cinematographic cameras for amateur use are manufactured it is customary to design them so as to provide a very compact structure and the film-actuating mechanism being of reduced size is considerably simplified because of the fact that smaller film ribbons are used and the film engaging element usually enters perforations at one margin only of the ribbon. When ultra-rapid motion is produced in mechanism of this character there is sometimes a tendency of the film to "back-up" during its momentary stoppage which is the period during which the film-engaging element is returning to its initial position to again enter and move the film, and it is to overcome this tendency that I have devised the present structure which provides means to engage and hold the film against reverse movement during the return of the film-engaging element.

It is one of the objects of the present device to provide film retarding or arresting means that will successfully overcome any back-up tendency of the film during different speeds at which the mechanism is operated. Other objects reside in the provision of a structure of this character that is dependable in operation, novel and sturdy in construction, and which is of considerable simplicity so that it will not increase the cost of production.

I prefer to carry out my invention and to accomplish the numerous objects thereof in substantially the manner hereinafter fully described and as more particularly pointed out in the claims, reference being herein made to the accompanying drawing that forms a part of this specification.

In the drawing:—

The drawing is merely schematic for the purpose of illustrating a typical or preferred form in which my invention may be produced, and in said drawing the same reference characters have been employed to designate like parts wherever they appear throughout the several views.

The film-actuating mechanism is mounted upon a circular or disk-like plate 5 at the front of the camera that is provided with a suitable opening at one edge of its center to permit the passage of light rays to the film that moves intermittently back of said plate. Across the opening there is placed a film guide in the form of an elongated metal plate 6 that is vertically disposed and is provided centrally with a light aperture 7 of rectangular outline and of the dimensions of the picture to be photographed upon the film which intermittently stops back of the aperture. The longitudinal vertical sides of the plate 6 have inwardly or rearwardly extending flanges 8 that are parallel to each other and are spaced apart approximately the width of the film, so that there is provided a film passageway along or through which the film will travel when it is being actuated by the hereinafter described mechanism. In order to maintain the film in this passageway, any type of yieldable pressure member may be mounted on the structure and it is adapted to create just enough friction to permit the actuating mechanism to move the film without injury to the latter and to hold the film while it returns to its initial position. For the purpose of clearness, this pressure device is not shown as it forms no portion of my present invention and it may be of any of the well-known types used in motion-picture apparatus.

Figure 1:
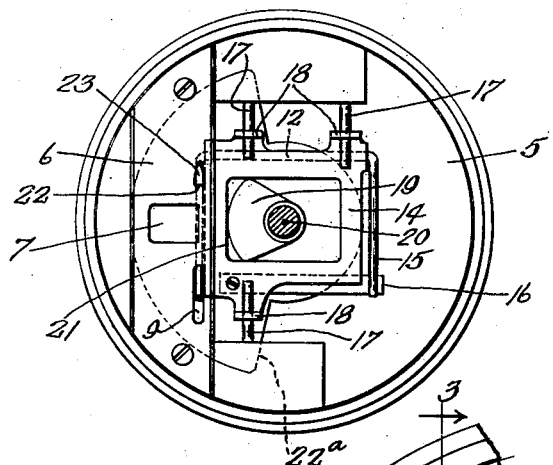
Figure 1 is a back view in elevation of a portion of a motion-picture camera which shows the film-actuating mechanism and the film passageway with my improvement applied thereto.
Figure 2:
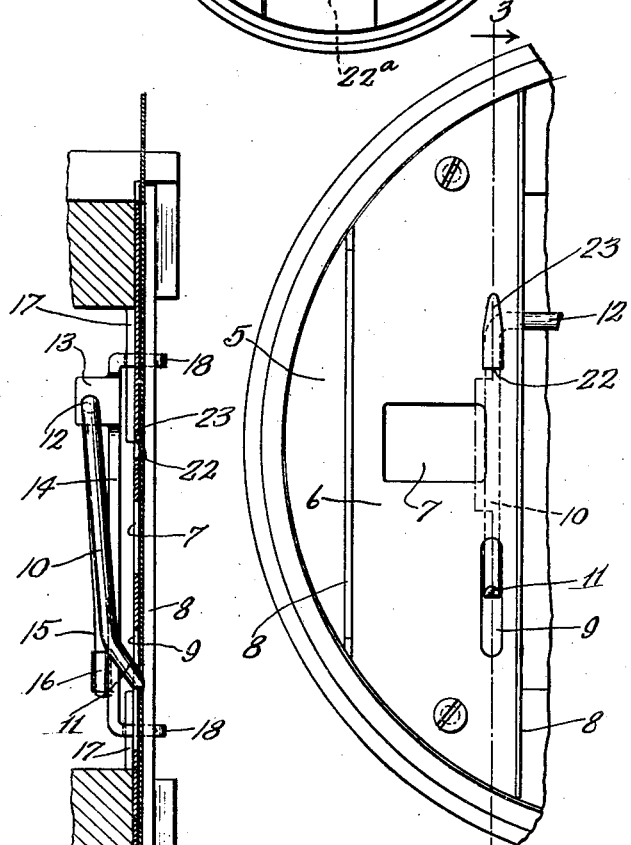
Figure 2 is a view of the film passageway drawn to an exaggerated scale to better illustrate my improvements.
Figure 3:
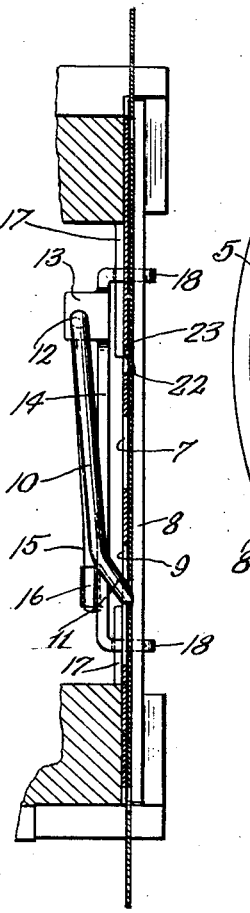
Figure 3 is a longitudinal section taken on line 3—3 of Figure 2 and looking in the direction indicated by the arrows.

Below the aperture 7 in the passageway, and to one side of the vertical plane of the adjacent edge of said aperture there is an elongated slot 9 through which protrudes the adjacent end of the film engaging pin or finger of the actuating mechanism. This finger is at one end of a length of wire that has been bent to an inverted U-shape one of the parallel side members 10 of which extends along the face of the passageway plate 6 opposite the face on which the film moves and its lower end portion is bent obliquely rearwardly towards the plate so that it provides a film engaging finger or pin 11 that protrudes through the slot 9 and into the passageway a distance sufficient to permit its extremity to enter the marginal perforations in the film. The intermediate or connecting member 12 of the U-shape wire is movably mounted in alining bearing-lugs 13 projecting forwardly from the upper portions of the vertical sides of the reciprocatory slide 14. The other parallel member 15 of the U-shaped wire extends downwardly along the side of the slide opposite the member or arm 10, and at its lower end it is engaged by the free end of a spring 16 that has its opposite end anchored upon the opposite lower corner of the slide, so that the U-shaped wire is thereby pressed yieldably towards the plane of the passageway plate 6 to maintain the finger or pin 11 in the slot 9 as will be seen in figure 3 of the drawing. The slide is reciprocably mounted upon guide-rods 17 secured in suitable blocks on the plate 5, there being apertured lateral ears 18 on the upper and lower edges of the slide that co-act with the guide-rods to permit of the reciprocatory movement of the slide. The means for reciprocating the slide consists of a cam or eccentric element 19 mounted upon a rotatable spindle 20 carried by the camera plate 5 and said cam is so positioned that it successively engages the edges of a rectangular opening 21 in the central portion of the slide and moves the latter up and down in the customary manner, and the segmental-shaped shutter 22ᵃ for alternately opening and closing the light aperture is also mounted upon the rotatable spindle 20 so that the reciprocation of the slide is always synchronized with the opening and closing of the light aperture by the shutter. When the slide is reciprocated, the pin or finger 11 while moving downwardly will engage in a marginal perforation in the film and will move the latter downwardly the proper distance to expose the film for the next picture, and upon the upward movement of the slide the finger will yieldably move on the surface of the film but will not move the latter.

It sometimes transpires that the presser member does not sufficiently hold the film during the upward or reverse movement of the actuating pin or finger and this more often occurs when the camera is operated at ultra-speed for slow-motion pictures during which the mechanism is traveling at an extremely high rate of speed with the result that there is a slight "back-up" of the film. For the purpose of preventing this contingency arising I have provided a stop in the film passageway which is preferably in the form of a shoulder or spur 22 that is punched inwardly from the plate 6 into the passageway above and in vertical alinement with the slot 9 and in such position that when the film is at rest during its intermittent advancement the shoulder will engage with a film perforation so that upward or reverse movement of the film is prevented. In order to prevent retarding the proper movement of the film or inadvertent engagement with a film perforation by the spur the metal of the plate above the same is formed into a tapered converging channel or groove 23 so that the film will readily slide over the spur in its downward movement.

From the foregoing it will be seen that I have provided a very simple means for preventing a reverse movement of the film, and while the same has been illustrated and described in connection with ultra-speed photography, it will be appreciated the structure may be utilized in other cinematographic apparatus. Also, there may be a spur or stop upon each side of the film passageway as well as double pins or flanges for engagement with perforations upon both margins of the film. Other changes may be made in the form and size of the structure, it being understood that the foregoing is merely for the purpose of description and no limitations therein contained should be read into the claims but said claim should be construed as broadly as possible in view of the prior art.

What I claim is:—

1. In motion picture apparatus, a film guide-plate having a light aperture, reciprocable feed devices that engage perforations in the film and intermittently move the latter past said aperture, and a spur formed integral with said guide-plate, said spur projecting from the face of the plate next the film and providing an abrupt lateral shoulder that enters the film perforations to prevent retrograde movement of the film.

2. In motion picture apparatus, a film guide-plate having a light aperture, reciprocable feed devices that engage perforations in the film and intermittently move the latter past said aperture, and a spur formed integral with said guide-plate, said spur projecting from the face of the plate next the film and diminishing in a direction opposite the direction of movement of the film with its broadest portion providing an abrupt lateral shoulder that enters the film perforations to prevent retrograde movement of the film.

3. In motion picture apparatus, a vertical guide-plate having a light aperture, vertically reciprocable feed devices that engage perforations in the film and intermittently move the latter downwardly on the plate past said aperture, and a spur formed integral with the face of said guide-plate next to the film, said spur being tapered in an upward direction and having an abrupt shoulder at its lower end that enters the film perforations to prevent retrograde movement of the film.

ALEXANDER FERDINAND VICTOR.